United States Patent
Rozman et al.

(10) Patent No.: US 9,088,230 B2
(45) Date of Patent: Jul. 21, 2015

(54) DUAL GENERATOR SYSTEM

(75) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 588 days.

(21) Appl. No.: 13/486,829

(22) Filed: Jun. 1, 2012

(65) Prior Publication Data

US 2013/0320763 A1  Dec. 5, 2013

(51) Int. Cl.
*H02J 3/28* (2006.01)
*H02P 9/02* (2006.01)
*H02P 9/30* (2006.01)

(52) U.S. Cl.
CPC .. *H02P 9/02* (2013.01); *H02P 9/30* (2013.01); Y10T 307/522 (2015.04)

(58) Field of Classification Search
CPC ..................................... H02P 9/02; H02P 9/30
USPC .......... 307/43, 47, 64–68, 84, 87; 322/46, 59, 322/86
See application file for complete search history.

(56) References Cited

U.S. PATENT DOCUMENTS

| | | | |
|---|---|---|---|
| 5,497,332 A * | 3/1996 | Allen et al. .................... | 700/295 |
| 5,596,492 A * | 1/1997 | Divan et al. ..................... | 363/95 |
| 5,929,537 A * | 7/1999 | Glennon .......................... | 307/46 |
| 6,657,322 B2 | 12/2003 | Skibinski et al. | |
| 7,002,317 B2 * | 2/2006 | Ganev .......................... | 318/701 |
| 7,755,208 B2 * | 7/2010 | Mehl et al. ................... | 290/36 R |
| 7,787,267 B2 | 8/2010 | Wu et al. | |
| 8,004,119 B2 | 8/2011 | Tsang et al. | |
| 8,063,612 B2 * | 11/2011 | Amler ............................. | 322/46 |
| 8,085,003 B2 | 12/2011 | Gieras et al. | |
| 8,487,559 B2 * | 7/2013 | Holweck et al. .............. | 318/362 |
| 8,928,293 B1 * | 1/2015 | Rozman et al. .................. | 322/79 |
| 2003/0030416 A1 * | 2/2003 | Fukaya ........................... | 322/24 |
| 2008/0001580 A1 * | 1/2008 | Shah ............................... | 322/46 |
| 2008/0093850 A1 * | 4/2008 | Taneja et al. .................. | 290/36 R |
| 2009/0045292 A1 * | 2/2009 | Maddali et al. .............. | 244/53 R |
| 2009/0108678 A1 * | 4/2009 | Algrain ........................... | 307/87 |
| 2010/0102637 A1 * | 4/2010 | Dozier et al. ................... | 307/84 |
| 2010/0148518 A1 * | 6/2010 | Algrain .......................... | 290/1 R |
| 2010/0181969 A1 * | 7/2010 | Gieras et al. .................... | 322/59 |
| 2010/0295517 A1 * | 11/2010 | Rozman et al. .................. | 322/57 |
| 2011/0062833 A1 * | 3/2011 | Gieras et al. ................. | 310/68 R |

* cited by examiner

*Primary Examiner* — Jared Fureman
*Assistant Examiner* — Carlos Laguerre
(74) *Attorney, Agent, or Firm* — Kinney & Lange, P.A.

(57) ABSTRACT

A dual generator system includes a main generator and an auxiliary generator. The main generator generates at least a first phase main output and a second phase main output. The auxiliary generator generates at least a first phase auxiliary output and a second phase auxiliary output, wherein the first phase auxiliary output is combined with the first phase main output to generate a first phase main output. An auxiliary generator control unit (AGCU) monitors the first phase combined output and the second phase combined output and in response independently regulates the first phase auxiliary output and the second phase auxiliary output.

7 Claims, 2 Drawing Sheets

DUAL GENERATOR SYSTEM

BACKGROUND

The present invention is related to electrical generators, and in particular to a dual generator system.

Electrical generators are widely employed to convert mechanical energy to electrical energy for distribution to one or more loads. In a typical application, a generator includes a generator control unit (GCU) that regulates the output of the generator as desired based on the application. For example, in a wound field synchronous generator the output is regulated by varying the excitation (i.e., current) provided to an excitation winding of the generator. However, in some applications this is made more difficult by the presence of an unbalanced load that results in phase to phase differences that cannot be regulated or corrected by modifying the excitation provided to the generator. Typically, phase to phase differences are handled via active filters connected to the output of the generator. However, active components require additional cooling that increases the cost and decreases the reliability of such systems.

SUMMARY

A dual generator system includes a main generator and an auxiliary generator. The main generator generates at least a first phase main output and a second phase main output. The auxiliary generator generates at least a first phase auxiliary output and a second phase auxiliary output, wherein the first phase auxiliary output is combined with the first phase main output to generate a first phase main output. An auxiliary generator control unit (AGCU) monitors the first phase combined output and the second phase combined output and in response independently regulates the first phase auxiliary output and the second phase auxiliary output.

DETAILED DESCRIPTION

The dual generator system of the present invention employs a main generator and an auxiliary generator. The output of the main generator is regulated by varying the excitation provided to an exciter winding (in embodiments in which the main generator is a wound field synchronous generator). The auxiliary generator generates at least a first phase auxiliary output and a second phase auxiliary output, each of which is independently controllable, such that phase-to-phase imbalances can be corrected by regulating the output of the auxiliary generator. In addition, the auxiliary generator can supplement the power capabilities of the main generator.

Figure 1:
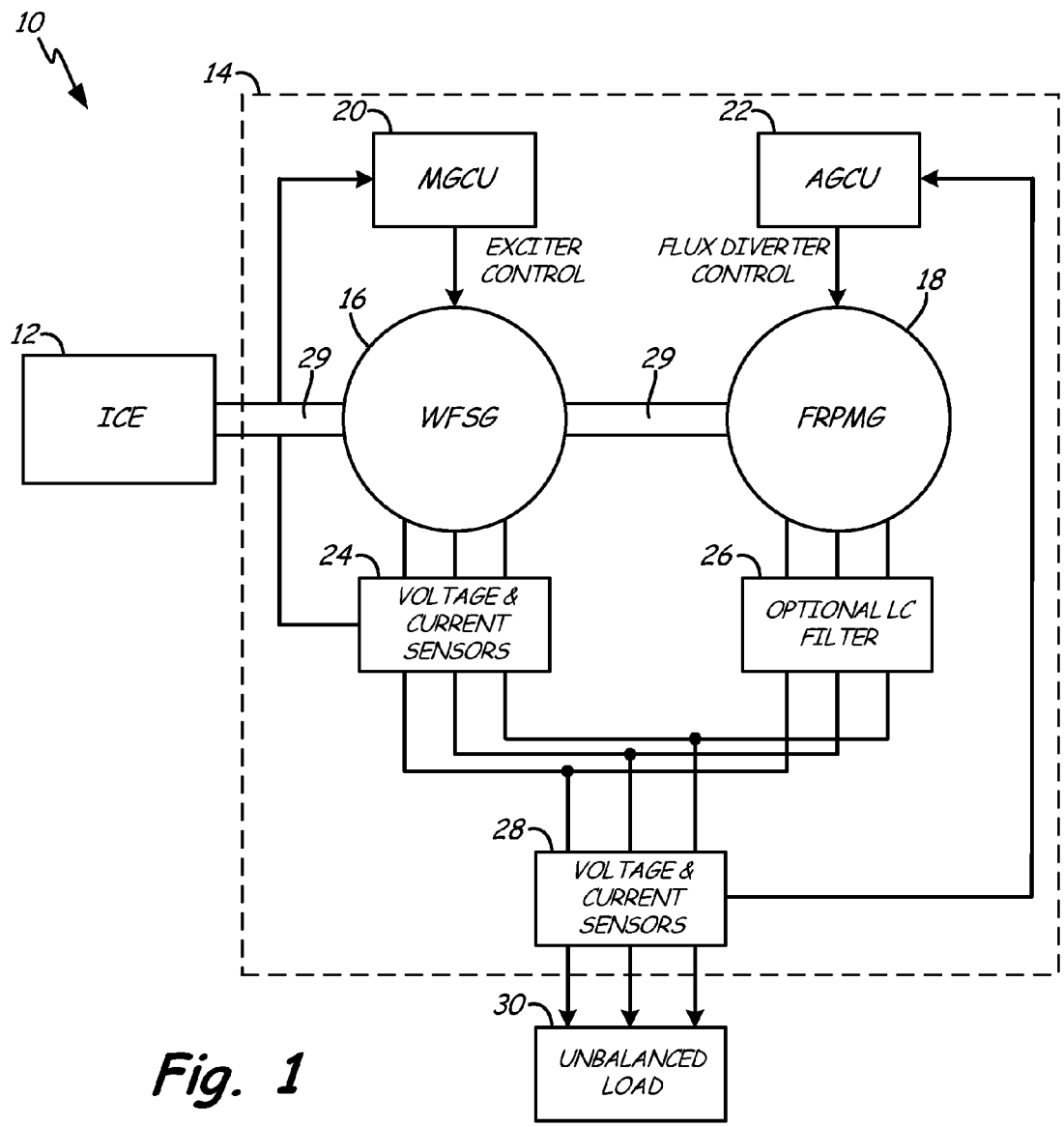
FIG. 1 is a block diagram of a generator system according to an embodiment of the present invention.

FIG. 1 is a block diagram of generator system 10 according to an embodiment of the present invention. Generator system 10 includes prime mover 12 and dual generator system 14. In the embodiment shown in FIG. 1, prime mover 12 is an internal combustion engine (ICE), although in other embodiments other machines for generating or communicating mechanical power may be employed. Dual generator system 14 includes main generator 16, auxiliary generator 18, main generator control unit (MGCU) 20, auxiliary generator control unit (AGCU) 22, main generator sensors 24, LC filter 26, and combined output sensors 28. Dual generator system 14 supplies electrical power to load 30. In one embodiment, load 30 is an unbalanced load that, if not corrected, will result in imbalances in the output provided by dual generator system 14.

In the embodiment shown in FIG. 1, shaft 29 communicates mechanical power from prime mover 12 to both main generator 16 and auxiliary generator 18. Main generator 16 and auxiliary generator 18 both have the same number of poles and produce same output frequency. The positions of main generator 16 and auxiliary generator 18 are aligned such that the outputs provided by both main generator 16 and auxiliary generator 18 are in phase and can therefore be combined. To maintain synchronous phase alignment, it is beneficial for main generator 16 and auxiliary generator 18 to share a common shaft (i.e., to maintain operate of both generators at the same speed).

Main generator 16 provides at least a first phase main output and a second phase main output. In the embodiment shown in FIG. 1, main generator 16 is a three-phase machine that provides a first phase main output, second phase main output, and third phase main output. In one embodiment, main generator is a wound field synchronous generator (WFSG). In other embodiment, other well-known generator topologies may be employed. The output of a WFSG is dependent on and can therefore be regulated via excitation provided to an exciter or field winding (not shown) of main generator 16. MGCU 20 monitors at least the first phase main output (e.g., voltage and/or current) and in response regulates the excitation provided to main generator 16 order to regulate the output to a desired value.

Auxiliary generator 18 provides at least a first phase auxiliary output and a second phase auxiliary output. In the embodiment shown in FIG. 1, auxiliary generator 18 is a three-phase machine that provides a first phase auxiliary output, a second phase auxiliary output, and a third phase auxiliary output. Each phase of auxiliary generator 18 is independently regulated. That is, the first phase auxiliary output can be regulated independent of the regulation of the second phase auxiliary output, and independent of the regulation of the third phase auxiliary output. The output of auxiliary generator 18 is provided to inductive-capacitive (LC) filter 26, which acts to reduce harmonics in the output of auxiliary generator 18. In some applications, LC filter 26 is not required and may be omitted. Each auxiliary output phase is combined with a corresponding main output phase to generate a combined output. For example, first phase auxiliary output is combined with the first phase main output to generate a first phase combined output. Likewise, a second phase auxiliary output is combined with the second phase main output to generate a second phase combined output, and a third phase auxiliary output is combined with the third phase main output to generate a third phase combined output. Combined output sensors 28 monitor the voltage and/or current associated with each phase of the combined outputs, which is provided in feedback to AGCU 22.

In one embodiment, auxiliary generator 18 is a flux-regulated permanent magnet generator (FRPMG). In a typical permanent magnet generator (PMG), the output of the PMG is a function only of the speed of the prime mover to which it is attached. However, a FRPMG (such as that employed by auxiliary generator 18) utilizes an armature winding and at least one control coil, wherein a control signal provided to the control coil varies the magnetic permeability of the flux diverter and therefore varies the output voltage of the FRPMG. In one embodiment, described in more detail with respect to FIG. 2, FRPMG includes a separate control winding for each auxiliary phase output of auxiliary generator 18, allowing each phase of the FRPMG to be separately regulated. A FRPMG according to an embodiment of the present invention is described in U.S. Pat. No. 8,085,003, titled "Voltage Regulated Permanent Magnet Generator", by Jacek F. Gieras and Gregory I. Rozman, the entire contents of which are incorporated by reference herein. In other embodiments, auxiliary generator 18 includes a plurality of wound field synchronous machines, each WFSG having a separate exciter winding to allow AGCU 22 to independently regulate the output of each WFSG.

In the embodiment shown in FIG. 1, AGCU 22 monitors the combined output of main generator 16 and auxiliary generator 18. Sensors 28 may include voltage and/or current sensors for providing feedback regarding the output voltage and/or current of dual generator system 14. Based on detected imbalances in the monitored phases, AGCU 22 regulates, independently, each output phase of auxiliary generator 18 to correct detected imbalances. In addition, AGCU 22 may regulate the output of auxiliary generator 18 to supplement the power provided by main generator 16, either to account for a loss of power associated with main generator 16, or to accommodate greater demand from load 30.

Figure 2:
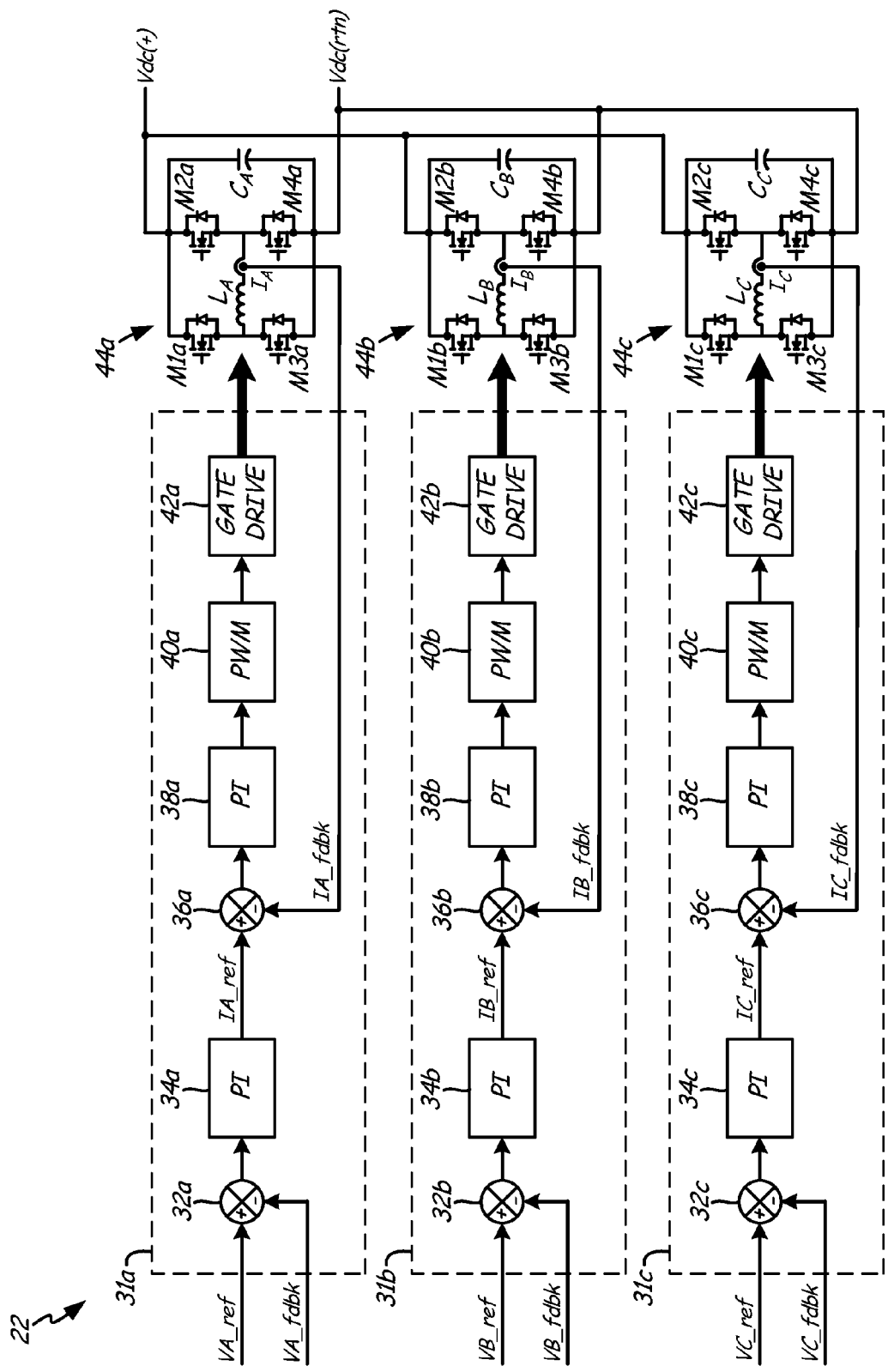
FIG. 2 is a block diagram of an auxiliary generator control unit (AGCU) according to an embodiment of the present invention.

FIG. 2 is a block diagram of control function implemented by auxiliary generator control unit (AGCU) 22 according to an embodiment of the present invention. AGCU 22 includes a plurality of separate control loops 31a, 31b, and 31c, each associated with a particular phase to be regulated. Control loops 31a, 31b, and 31c are used to regulate current in the control coils La, Lb, and Lc in response to the voltage regulators output. Capacitors $C_A$, $C_B$, and $C_C$ minimize ripple in the DC voltage applied across control windings $L_A$, $L_B$, and $L_C$. The embodiment shown in FIG. 2 is described with respect to a flux regulated permanent magnet generator (FRPMG), in which a plurality of separate excitation signals (i.e., flux diverter control signal) are provided to corresponding a control windings (e.g., $L_A$, $L_B$, $L_C$) to regulate the first, second and third phases, respectively, of auxiliary generator 18. In other embodiments, the excitation signals could be provided to separate exciter windings of a three separate wound field synchronous generators (WFSGs).

In the embodiment shown in FIG. 2, AGCU 22 monitors a voltage feedback VA_fdbk, VB_fbdk, and VC_fdbk provided by sensors 28 (shown in FIG. 1) representative of the combined voltage output of main generator 16 and auxiliary generator 18. Voltage feedback VA_fdbk is provided to control loop 31a, voltage feedback VB_fdbk is provided to control loop 31b, and voltage feedback VC_fdbk is provided to control loop 31c. In response, each control loop 31a, 31b, and 31c regulates current in control windings $L_A$, $L_B$, and $L_C$, respectively. The functions performed by each control loop 31a, 31b, and 31c are the same, except for the phase with which each is associated. Furthermore, functions performed by control loops 31a, 31b, and 31c may be implemented via a combination of hardware and/or software components.

For example, control loop 31a monitors voltage feedback VA_fdbk, and compares it at difference block 32a to reference value VA_ref. A difference between monitored voltage feedback VA_fdbk and reference value VA_ref is provided to proportional-integral (PI) controller 34a, which generates in response a current reference IA_ref. The reference current IA_ref is compared with monitored feedback current IA_fdbk by difference block 36a, wherein monitored feedback current IA_fdbk represents to the current of first control winding $L_A$. The resulting difference is provided to PI controller 38a, which generates a signal to minimize the difference. The output of PI controller 38a is provided to pulse width modulator (PWM) 40a to generate pulse width modulation (PWM) signals. The PWM signals are provided to gate drive 42a, to generate gate drive signals for each of the plurality of solid-state switching devices M1-M4 to selectively turn the solid-state devices On and Off to create the desired current in control coil $L_A$. In this way, a first phase of auxiliary generator 18 is individually controlled to correct imbalances in the combined output of dual generator system 14.

Control loops 31b and 31c comprise the same elements described with respect to control loop 31a, with similar elements marked with a "b" or "c", respectively. For example, control loop 31b includes difference block 32b, PI controller 34b, difference block 36b, PI controller 38b, PWM 40b, gate drive 42b, and H-bridge circuit 44b, which includes solid-state switching devices M1b, M2b, M3b, and M4b. Similarly, control loop 31c includes difference block 32c, PI controller 34c, difference block 36c, PI controller 38c, PWM 40c, gate drive 42c, and H-bridge circuit 44c, which includes solid-state switching devices M1c, M2c, M3c, and M4c. Control loop 31b monitors voltage feedback VB_fdbk and compares it to reference voltage VB_ref, and control loop 31c monitors voltage feedback VB_fdbk and compares it to reference voltage VB_ref. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A dual generator system comprising:
    a main generator that generates at least a first phase main output and a second phase main output;
    a flux regulated permanent magnet generator (FRPMG) that generates at least a first phase auxiliary output and a second phase auxiliary output, wherein the first phase main output is combined with the first phase auxiliary output to generate a first phase combined output and the second phase main output is combined with the second phase auxiliary output to generate a second phase combined output, and wherein the FRPMG includes at least a first control winding and a second control winding and provides a first flux diverter control signal to the first control winding to regulate the first phase auxiliary output and provides a second flux diverter control signal to the second control winding to regulate the second phase auxiliary output; and
    an auxiliary generator control unit (AGCU) comprising:
        a first control loop that includes an outer control loop that compares the first phase combined output with a first phase reference value to generate a first flux diverter command signal and an inner loop that compares the first flux diverter command signal with the first flux diverter control signal and generates in response control signals to regulate the first flux diverter control signal to increase or decrease the first phase combined output; and
        a second control loop that monitors the second phase combined output and in response regulates the second flux diverter control signal to increase or decrease the second phase combined output.

2. The dual generator system of claim 1, wherein the first phase combined output and the second phase combined output monitored by the AGCU is a voltage.

3. The dual generator system of claim 1, wherein the main generator and the auxiliary generator are connected to a common shaft for receiving a mechanical input.

4. The dual generator system of claim 1, wherein the main generator is a wound field synchronous machine that includes an exciter winding.

5. The dual generator system of claim 4, further including:
 a main generator control unit (MGCU) that monitors an output of the main generator and in response provides excitation to the exciter winding to regulate the monitored output of the main generator.

6. A method of correcting imbalances between at least a first phase combined output and a second phase combined output of a dual generator system that includes a main generator that generates at least a first phase main output and a second phase main output and a flux regulated permanent magnet generator (FRPMG) that generates at least a first phase auxiliary output and a second phase auxiliary output, the FRPMG including a first control winding and a second control winding that are individually excited to independently regulate the first phase auxiliary output and the second phase auxiliary output, the method comprising:
 monitoring voltage and/or current associated with each of the first phase combined output and the second phase combined output; and
 independently regulating the first phase auxiliary output and the second phase auxiliary output of the auxiliary generator to correct imbalances between the first phase combined output and the second phase combined output;
 wherein regulating the first phase auxiliary output of the FRPMG includes regulating a first flux diverter control signal provided to the first control winding based on the monitored voltage and/or current associated with the first phase combined output, and wherein regulating the second phase auxiliary output of the FRPMG includes regulating a second flux diverter control signal provided to the second control winding based on the monitored voltage and/or current associated with the second phase combined output; and
 wherein regulating the first flux diverter control signal includes:
   comparing the monitored voltage and/or current associated with the first phase combined output to a first phase reference value;
   generating a flux diverter command signal based on the comparison of the monitored voltage and/or current associated with the first phase combined output with the first phase reference value;
   monitoring the first flux diverter control signal provided to the first control winding;
   comparing the first flux diverter command signal to the monitored first flux diverter control signal; and
   regulating the first flux diverter control signal based on the comparison of the first flux diverter command signal to the monitored first flux diverter control signal.

7. An auxiliary generator control unit (AGCU) that controls the operation of a flux-regulated permanent magnet generator (FRPMG) employed in a dual generator system that also includes a main generator, wherein the FRPMG provides a first phase auxiliary output for combination with a first phase main generator output to generate a first phase combined output and a second phase auxiliary output for combination with a second phase main generator output to generate a second phase combined output, and wherein the AGCU generates a first flux diverter signal for provision to a first flux control winding of the FRPMG to regulate the first phase auxiliary output of the FRPMG, and generates a second flux diverter signal for provision to a second flux control winding of the FRPMG to independently regulated the second phase auxiliary output of the FRPMG, the AGCU comprising:
 a first control loop circuit that includes:
   a first comparator that compares the first combined output with a first reference value to calculate a first difference value;
   a first proportional-integral (PI) controller that generates a first flux diverter command signal in response to the first difference value;
   a second comparator that compares the first flux diverter command signal to the first flux diverter control signal provided to the first control winding to calculate a second difference value;
   a second PI controller that generates a second reference signal in response to the second difference value;
   a pulse-width modulator that generates pulse-width modulation (PWM) signals in response to the second reference signal; and
   a gate drive circuit that generates gate drive signals based on the PWM signals for provision to a plurality of solid-state switching devices to selectively turn the solid-state switching devices On/Off to regulate the first flux diverter control signal provided to the first control winding; and
 a second control loop circuit that monitors the second phase combined output, compares the second phase combined output with a second reference value to detect imbalances in the monitored second phase output indicative of an unbalanced load, and regulates the second phase auxiliary output to correct detected imbalances.

* * * * *